United States Patent [19]

Brown

[11] Patent Number: 5,155,672

[45] Date of Patent: Oct. 13, 1992

[54] SWITCHED MULTI-TAPPED TRANSFORMER POWER CONVERSION METHOD AND APPARATUS

[75] Inventor: Craig W. Brown, Seattle, Wash.

[73] Assignee: Heart Interface Corporation, Kent, Wash.

[21] Appl. No.: 565,450

[22] Filed: Aug. 9, 1990

[51] Int. Cl.⁵ .............................................. H02M 1/12
[52] U.S. Cl. ...................................... 363/43; 363/26; 363/39; 323/255
[58] Field of Search ...................... 363/39, 40, 43, 133, 363/134, 26; 307/107; 323/255, 257, 258, 343

[56] References Cited

U.S. PATENT DOCUMENTS

| Re. 28,986 | 9/1976 | Heinrich et al. | 363/43 |
|---|---|---|---|
| 3,374,414 | 3/1968 | Garnett | 363/43 |
| 3,419,790 | 12/1968 | Guhn | 363/43 |
| 3,458,797 | 7/1969 | Larsen | 363/43 |
| 3,491,282 | 1/1970 | Heinrich et al. | 363/43 |
| 3,564,393 | 2/1971 | Williamson | 323/21 |
| 3,581,212 | 5/1971 | McMurray | 363/43 |
| 3,652,918 | 3/1972 | Marzolf | 363/43 |
| 4,194,239 | 3/1980 | Jayaram et al. | 363/109 |
| 4,476,520 | 10/1984 | Gallemore | 363/43 |
| 4,479,175 | 10/1984 | Gille | 363/8 |
| 4,480,297 | 10/1984 | Chetty | 363/26 |
| 4,685,043 | 8/1987 | Mehnert | 363/43 |
| 4,742,441 | 5/1988 | Akerson | 363/97 |
| 4,775,923 | 10/1988 | Schmid et al. | 363/43 |
| 4,780,801 | 10/1988 | Gill | 363/25 |

FOREIGN PATENT DOCUMENTS 1144178 3/1985 U.S.S.R. .................. 363/8

OTHER PUBLICATIONS

AC Constant Voltage Regulator by Improved Partial Voltage Phase Control Technique, Maruhashi, pp. 47-54, Jul. 1975, Electrical Engineering in Japan.

Primary Examiner—Steven L. Stephan
Assistant Examiner—Adolf Berhane
Attorney, Agent, or Firm—Kolisch, Hartwell, Dickinson, McCormack & Heuser

[57] ABSTRACT

A switched multi-tapped transformer-based power conversion circuit is disclosed. A polarity alternator comprising dual switch devices controlled by a microprocessor selectively periodically impresses across a transformer's center-tapped primary winding a voltage from a battery to produce a modified square waveform. Each of the taps of the transformer's secondary winding synchronously selectively switched by the microprocessor to a common wired-OR junction where the discrete voltage levels combine to produce a stepped approximation of a stored sine waveform. The switching circuits for each of the taps comprises dual back-to-back series-connected FET switches with diodes shunting each FET's source and drain. The microprocessor periodically senses the voltage across the primary winding, calculates the voltage across the secondary winding based upon the predetermined turns ratio of the tap that is switched to the common junction and compares the calculated output voltage with a normalized memory-based sine wave representation, thereby to determine when to switch to another tap. The converter, which operates concurrently as an inverter and a charger, responds in real time to changing DC source and AC load conditions. A similar converter having a full-wave rectifier on the primary winding side of the transformer is connectable to an AC source and provides for the charging of a connected DC load.

12 Claims, 7 Drawing Sheets

SWITCHED MULTI-TAPPED TRANSFORMER POWER CONVERSION METHOD AND APPARATUS

BACKGROUND AND SUMMARY OF THE INVENTION

This invention relates generally to power conversion method and apparatus in which a DC input voltage is converted to an AC output voltage of predetermined waveform shape and amplitude characteristics. More specifically, alternating polarity, modified square wave output voltages across a transformer's multi-tapped secondary winding are selectively switched to a common wired-OR junction where they combine to produce a regulated, source- and load-responsive, stepped approximation to a stored waveform representation. Series-connected, independently controlled switch devices forming switching circuits connected between each tap and the common junction are operable bidirectionally so that rectified surplus AC power concurrently recharges the DC source. A similar circuit is described that is operable as a charger only.

With high-frequency switching sine wave inverters, if the application requires typical operation into a fairly small load, but occasional operation into a very large load, one must buy a sine wave product rated for the large load. With square wave inverters, substantial surge capacity (e.g. three times the rated continuous power) is available, but there is insufficient peak voltage (contrast current) during such surges reliably to operate high inductance loads, e.g. motors. A square wave inverter typically generates little radio frequency interference (RFI) but has too high a total harmonic distortion (THD) ($\geq 50\%$) reliably to drive a typical AC load, which expects a 'clean' sinusoidal input. A sine wave inverter has relatively low THD ($\leq 5\%$), but, because of the high switching frequency typically employed, generates an undesirably high amount of RFI.

It is a principal object of the present invention to provide power conversion apparatus that exhibits only moderate THD and that generates little RFI.

Another object of the invention is to provide inversion apparatus that produces an output AC voltage waveform that represents a stepped approximation to a sine waveform and the root-mean-squared (RMS) value of whose amplitude is substantially equal to the RMS value of the sine waveform that it approximates.

It is yet another object to provide such inversion apparatus with the ability to respond in real time to changing conditions of DC source or AC load.

Still another object is to use bidirectional switching devices alternately to impress a positive and negative DC voltage across the primary winding of a transformer and to use bidirectional switching devices connected in series with corresponding multiple taps of the secondary winding of the transformer, in order to provide not only inversion, but also concurrent charging of an DC element by an AC element.

Another important object is to provide charging apparatus that, like such inversion apparatus, includes a switched, multi-tapped transformer, as above.

Yet another object of the invention is to provide such apparatus in a form that is relatively easily and inexpensively manufactured.

The present invention solves the prior art problems by producing a high peak amplitude voltage, and delivers such a voltage when the load needs it the most, e.g. during start-up of a motor. It does so by providing an laternating polarity voltage to a center-tapped primary winding of a transformer, wherein the alternation is achieved by the programmable logic control of bidirectional switching devices connected between a negative battery terminal and either of the secondary winding's end taps. The transformer has a multi-tapped secondary winding, wherein the individual taps having predetermined turns ratios relative to the primary winding are selectively wired-OR'd by the logic-controlled, sequential operation of an array of switching circuits. The logic controller determines which of the switching circuits to operate at any given moment based upon which tap is currently connected, the calculated value representing the voltage across the secondary winding and the difference between the normalized, calculated voltage and a stored sine waveform representation. The result is a stepped approximation to a sine waveform that is highly responsive in real time to dynamically changing conditions of the DC source, e.g. battery sag, and the AC load, e.g. motor surge. In a modification to the invention, the apparatus operates as a battery charger only.

These and other objects and advantages of the invention will be more clearly understood from a consideration of the accompanying drawings and the following description of the preferred embodiment.

DETAILED DESCRIPTION OF THE PREFERRED EMBODIMENT

Figure 1:
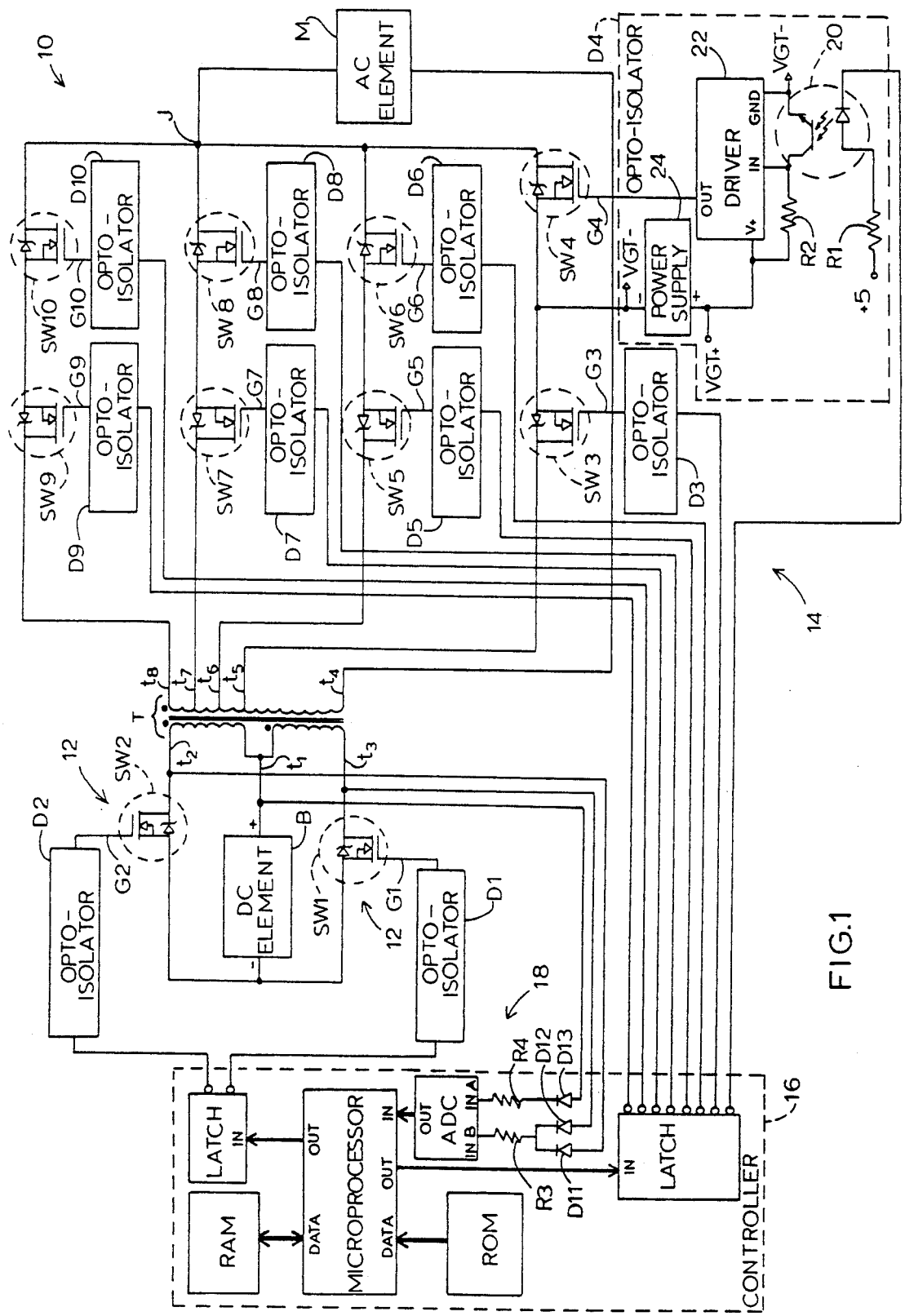
FIG. 1 is a schematic/block diagram of the power conversion apparatus of the invention made in accordance with its preferred embodiment.
Figure 2:
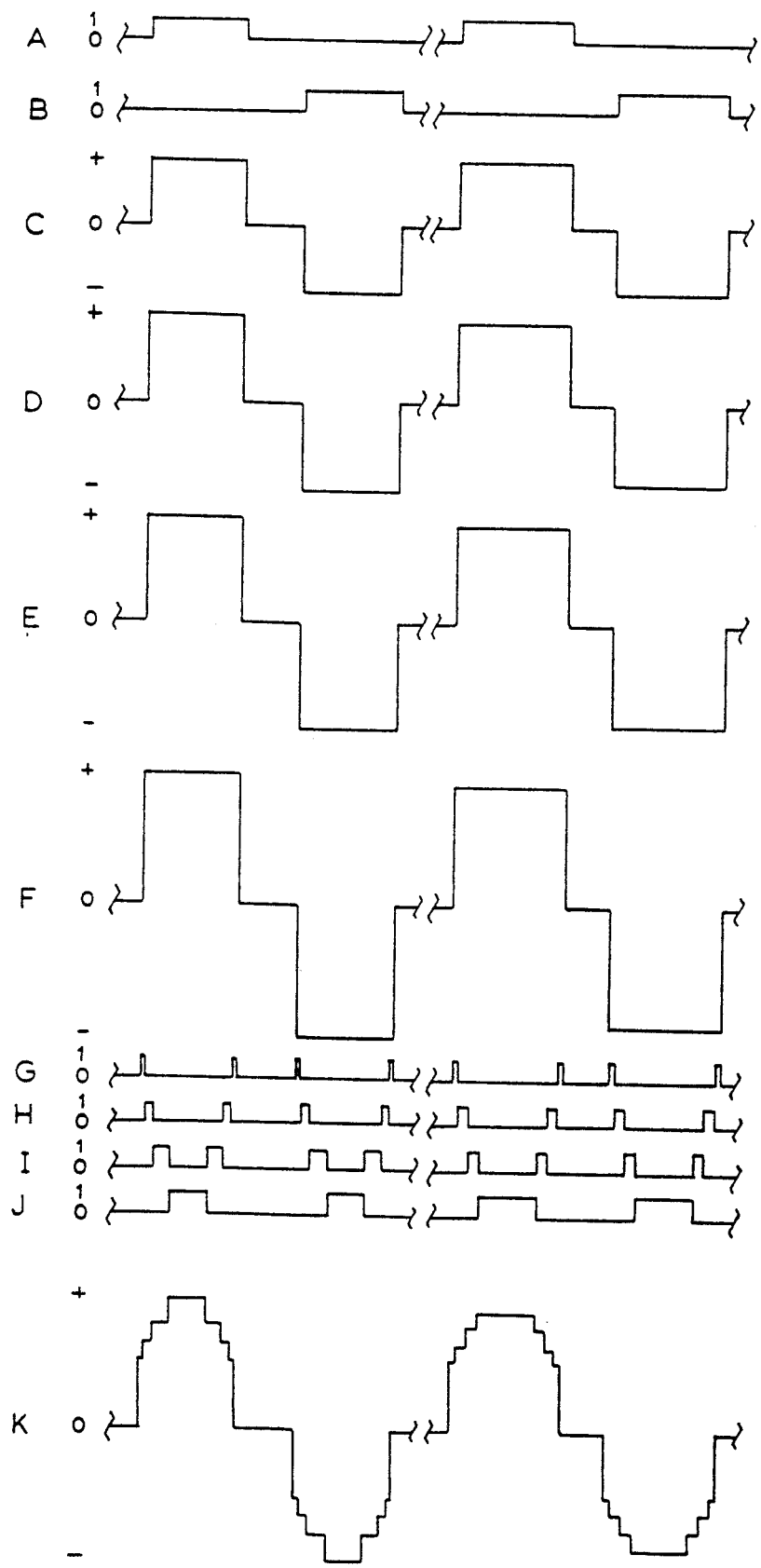
FIGS. 2A through 2K show selected waveforms illustrative of the operation of the method and apparatus of the invention.

Referring collectively to FIGS. 1 and 2, a schematic/block diagram of the power conversion circuit or apparatus in its preferred embodiment is indicated generally at 10, and selected timing diagrams for signals related to its operation are shown. Apparatus 10 comprises programmable logic-controlled alternating means 12 for selectively impressing a periodically alternating polarity DC voltage across the primary winding of a transformer; operatively connected therewith center and end taps $t_1$, $t_2$, $t_3$ of the primary winding of a transformer T having a multi-tapped secondary winding with a common lead or first end $t_4$, multiple individual tap leads corresponding to plural taps including plural intermediate taps $t_5$, $t_6$, $t_7$ and a second end tap $t_8$, which have predefined, graduated turns ratios relative to the primary winding; switching means or a plurality of programmable logic-controlled switching circuits 14 responsive to switch control signals, wherein first sides of switching circuits 14 are operatively connected with multiple, or a second and intermediate, taps or tap leads of the secondary winding of transformer T, and other sides of which are connected together to form a wired-OR junction J; and a switch controller means, or a controller 16, e.g. a microprocessor and associated memory including read-only memory (ROM) and read-and-write memory (RAM) and input/output circuitry including an analog-to-digital converter (ADC) and latches.

When apparatus 10 is in use, a center tap $t_1$ of the primary winding of transformer T is operatively connected to the positive terminal of a DC element or source having a pair of terminals, e.g. a battery, B, and a negative or common terminal of battery B is operatively connected, to either of two end taps $t_2$, $t_3$ of the primary winding of transformer T, alternately at a first frequency that corresponds to the operating frequency of an AC element or load, e.g. motor M, first and second terminals of which are operatively connected between junction J and a common lead, or first end tap, $t_4$ of transformer T. Switching means 14 operatively is interposed between intermediate and second end taps $t_5$, $t_6$, $t_7$, $t_8$ of transformer T and a second terminal of AC element M and, as will be described, is switchable under the influence of logic control signals sequentially to select ones of the multiple tap leads to be conductively connected with such second AC element terminal.

Alternating means, or a programmable logic-controlled, polarity-alternating circuit, 12 can be any conventional means for alternately connecting either of the primary winding end taps of transformer T to the other DC element terminal, thereby selectively impressing a periodically alternating polarity, DC voltage across the primary winding of transformer T. In the preferred embodiment, alternating means 12 includes diode means shunted across transistor means, or preferably dual unidirectional, field-effect transistor (FET) switch devices SW1, SW2 being operatively connected as shown in FIG. 1 between battery B and transformer T. Each of the FETs within switch devices SW1, SW2 have integral diodes shunting the source and drain, and the gates G1, G2 of switch devices SW1, SW2 preferably are optically isolated from controller 16 by opto-isolators D1, D2. Transformer T is made to achieve a desired volt-ampere rating based upon the intended application, and the FETs (which may be connected and operated in parallel, especially on the primary winding side of the transformer, to achieve a needed current rating) that form polarity alternating means 12 and plural switching circuits 14 are chosen for a preferably low forward voltage drop at a given operating temperature, which of course may be reduced by conventional heat sinking.

In operation, controller 16 produces a pair of primary switch control signals illustrated in FIGS. 2A and 2B which are characterized as being square waves of the desired operating frequency of an AC load, e.g. 60-Hz, and of less than 50% duty cycle, defining lull periods during which neither is active (high, in accordance with a high-true logic convention). By virtue of such lull periods, which correspond with n·180° phase angles (where n is an integer) of the fundamental periodic AC waveform, polarity-alternating circuit or alternating means 12, responsive to controller 16, operates selectively to produce an alternating polarity square wave the positive- and negative-going portions of which are interposed by lull periods of time during which the primary winding of transformer T is deenergized. Thus, polarity-alternating circuit 12 operates in such manner that the primary winding of transformer T is deenergized for each interval of time within which the alternating polarity voltage produced by polarity-alternating circuit 12 changes polarity, i.e. for a symmetric interval of time around the zero-voltage excursions of the AC output of apparatus 10.

Referring still to FIGS. 1 and 2 and focusing now on the secondary winding side of transformer T, at least one of and preferably each of the plurality of switching circuits 14 operates bidirectionally and comprises dual, back-to-back, series-connected, independently controllable, unidirectional, preferably field-effect transistor (FET), switch devices SW3, SW4, SW5, SW6, SW7, SW8, SW9, SW10 having integral diodes shunting each FET's source and drain, with the corresponding gates G3, G5, G6, G7, G8, G9, G10 of the switch devices being optically isolated from controller 16, as indicated schematically in FIG. 1. The switch devices within each series-connected pair are connected back-to-back (with their sources connected together) and are independently controllable by controller 16, which generates secondary switch control signals to switching means 14 that drive the FETs' gates through opto-isolators D3, D4, D5, D6, D7, D8, D9, D10 (of which only D4 is shown in detail that is typical of all such opto-isolators used in apparatus 10).

Briefly considering opto-isolators D3, D4, D5, D6, D7, D8, D9, D10, it will be understood that each is implemented, in accordance with the preferred embodiment of the invention, as described in reference to opto-isolator D4. Opto-isolator D4 includes an optical isolation device 20 consisting of a light-emitting diode (LED) and a light-responsive transistor. The low-active output of one of the latches of controller 16 is connected to the cathode of the LED, the anode of which is biased via a resistor R1 to +5-volts. The common sources of each of the series-connected switch device pairs, e.g. the common sources of switch devices SW3, SW4, provide a reference ground VGT− that is isolated from the logic ground of apparatus 10. A separate power supply for each switch device pair of plural switching circuits 14 supplies, relative to reference ground VGT−, a positive supply voltage VGT+, which powers the opto-isolator circuitry including an inverting driver 22, a bias resistor R2 and the light-responsive transistor of optical isolation device 20

When the connected digital output of the latch is active (low), the LED is illuminated and the light-responsive transistor conducts, pulling the input IN to driver 22 toward VGT−, or low relative to VGT+. The output OUT from inverting driver 22, in turn, goes high, thereby activating G4 and closing switch SW4. Complementarily, when the connected latch output is inactive (high), G4 goes inactive (low) and switch SW4 is opened. Persons skilled in the art will appreciate that VGT+, VGT− are supplied in common to opto-isolators whose switch devices are connected in series, but are supplied by separate power supplies identical with power supply 24 independently to opto-isolators whose switch devices are not series-connected. Thus, the operation of opto-isolators D1, D2, D3, D4, D5, D6, D7, D8, D9, D10 is understood to provide isolation of the high-power FET switches (even on the low-power, primary winding side of transformer T) from the digital logic control circuitry of apparatus 10.

Those skilled in the arts will appreciate that transformer T steps up the alternating polarity, DC voltage impressed across its primary winding by factors corresponding to the turns ratios of the secondary windings relative to the primary winding. This produces, in accordance with the preferred embodiment of the invention, positive- and negative-going pulses (interposed by zero-voltage lull periods) between common lead t₄ of the secondary winding and each of four secondary winding taps t₅, t₆, t₇, t₈. Because the primary switches are operated at the nominal operating frequency of the AC element, e.g. 60 Hz, the voltages that appear on taps t₅, t₆, t₇, t₈ consist of what may be thought of as sequences of paired, alternately positive- and negative-going pulses, wherein the pulse pairs occur at an alternation frequency that is to the operating frequency of the AC element to which apparatus 10 is connected.

Unlike prior art devices, the apparatus of the invention uses plural, discrete, positive and negative voltage levels to form a stepped approximation to a sine waveform. In the preferred embodiment, four discrete voltage levels produced at plural individual leads, or intermediate taps, $t_{5\%}$, t₆, t₇, and at individual lead, or second end tap, t₈, are established by tapping transformer T to effect corresponding, graduated turns ratios of each secondary winding tap relative to the primary winding. In accordance with the preferred embodiment of the invention, the number and turns ratios of these taps are predefined for a given nominal DC input and AC output configuration when transformer T is manufactured. For example, in a preferred 12-volt DC to 120-volt AC embodiment of the invention, the secondary winding taps t₅, t₆, t₇, t₈ establish predefined turns ratios of 8, 10, 12 and 15, respectively, relative to the primary winding. Such predefined number and turns ratios of the taps are deemed to meet desired performance criteria for apparatus 10 in its preferred embodiment, e.g. desired sine waveform, regulatory responsiveness, efficiency and charger utility.

As may be seen from FIGS. 2C through 2F, apparatus 10, when operatively connected with a DC source, produces on the first sides of plural switching circuits 14 voltage waveforms (each consisting of alternating polarity, positive- and negative-going pulses interposed by lull, or zero-voltage, periods of time corresponding to those lull periods when the primary winding of transformer T is deenergized) having different peak amplitudes from, but virtually identical timing to, one another. When any of switching circuits 14 is in a first, non-conducting state, the corresponding one of multiple tap leads t₅, t₆, t₇, t₈ is operatively isolated from the AC element. Complementarily, when any of switching circuits 14 is selected, or enabled, to be in a second, conducting state, the corresponding one of the multiple tap leads is operatively connected with the AC element.

The states of plural switching circuits 14 corresponding to secondary winding taps t₅, t₆, t₇ and t₈ are indicated in FIGS. 2G, 2H, 2I and 2J by the high and low portions of waveform that symbolize the respective conducting and non-conducting states of paired switch devices SW3/SW4, SW5/SW6, SW7/SW8 and SW9/SW10, respectively. Not shown in FIGS. 2G through 2J, for reasons of clarity and simplicity, are those conductive states of plural switching circuits 14 that correspond with lull periods (during which the primary winding of transformer T is deenergized) when two or more of plural switching circuits 14 simultaneously are closed for the purpose of collapsing any residual magnetic field in the secondary winding of the transformer.

Those skilled in the art will appreciate that, because of the use of back-to-back, series-connected switch devices in each of plural switching circuits 14, switching circuits 14 when selected by controller 16 are capable of conducting current from DC element B to AC element M, or vice versa. Further, the individual switch devices, e.g. switch devices SW3, SW4, of the back-to-back, series-connected switch device pairs of each of plural switching circuits 14 are independently operable by switch controller means 16, which produces corresponding dual switch control signals, e.g. those connected with gates G3, G4, to which the individual switch devices are responsive. The importance of the independent operability of the individual switch devices and the importance of the bidirectional operability of the paired switch devices will be appreciated when the switch control and regulation methods of the invention are described.

The switch control signals are generated by controller 16 in such manner that plural ones of tap leads t₅, t₆, t₇, t₈ are conductively connected with the AC element's second terminal during controllably brief periods of time and that only one of the tap leads at a time is so-connected during controllably, substantially, relatively longer periods of time within each AC cycle. This will be better understood by reference to the flowchart of FIG. 3B, described below. By supplying the switch control signals to switching circuits 14 in a desirable timing sequence, thereby controllably, sequentially selecting higher taps (during the first and third quarter cycles of the AC cycle) and lower taps (during the second and fourth quarter cycles), controller 16 operates in such manner that the AC output voltage that appears on the FET switch devices' common drains at wired-OR junction J, and thus is supplied to the AC element, is a stepped approximation to any desired waveform, e.g. the stepped approximation to the sine waveform shown in FIG. 2K, which may be seen to be symmetric over each half cycle of the alternating polarity voltage (i.e. symmetric relative to $(2n-1)\cdot 90°$ phase angles (where n is an integer)).

The circuit described above operates concurrently as inverter and charger. This is because of the bidirectional switches employed in the secondary side between transformer T and the AC element, and because of the active switches provided in the primary side between the DC element and transformer T. So long as one of switching circuits 14 is closed (conducting), it conducts in either direction because of the integral diode within each FET switch device forming a part thereof. Thus, if the DC element, e.g. battery B, is of higher potential than the AC element, e.g. motor M, then the bidirectional switch that is closed (conducting) will permit current to flow from the higher potential DC element to the lower potential AC element. Conversely, if the AC element, e.g. motor M, is at a higher potential than the DC element, e.g. battery B, then the bidirectional switch that is closed (conducting) will permit current flow from the higher potential AC element to the lower potential DC element. Under the former conditions, the circuit acts as an inverter. Under the latter conditions, the circuit acts as a charger.

The AC voltage waveform shown in FIG. 2K, which is used to drive an AC element, e.g. motor M, has a number of advantages over prior art square wave and high-frequency switching sine wave inverter voltage waveforms. A square wave inverter typically generates little radio frequency interference (RFI) but has too high a total harmonic distortion (THD) ($\geq 50\%$) reliably to drive a typical AC load, which expects a 'clean' sinusoidal input. A sine wave inverter has relatively low THD ($\leq 5\%$), but because of the high switching frequency typically employed, generates undesirably high radio frequency interference (RFI) radiation. The inverter circuit of the present invention has a moderate THD (20-50%) and yet generates very little RFI radiation. This is because its stepped approximation to a sine waveform is a better approximation to a sine wave than is the square wave, and because its relatively low switching frequency and dv/dt characteristics generate little noise. Notably, the switching frequency of the circuit described herein, e.g. 480-Hz (4 on-off tap switchings/phase·2 phases/cycle ·60-Hz=480-Hz) is on the same order of magnitude as that of the operating frequency of the AC load, e.g. 60-Hz, rather than being more than two orders of magnitude higher, as is common in high frequency switching sine wave inverters, e.g. 36k-Hz (where k=$2^{10}$).

Importantly, FIG. 1 shows that controller 16 includes means indicated generally at 18 for 1) periodically sensing the instantaneous voltage amplitude across the primary winding of transformer T (or between primary winding end taps $t_2$, $t_3$), preferably at a frequency substantially greater than the frequency with which alternating means 14 operates, e.g. fifteen times during each quarter cycle; 2) calculating a corresponding instantaneous voltage amplitude between the secondary winding's first end tap and the wired-OR junction based upon the predefined plural turns ratios of the secondary winding; 3) comparing the calculated instantaneous voltage amplitude with a desired, corresponding, instantaneous voltage amplitude, preferably of a sine waveform representation stored in a memory storage location within controller 16, e.g. ROM, to produce a comparison result; and 4) responsive to the comparison result, supplying switch control signals to switching circuits 14 in such manner that the second end tap and the intermediate taps of the secondary winding selectively, sequentially are operatively connected with wired-OR junction J to produce across an AC element, when in operative connection between the first end tap of the secondary winding and the wired-OR junction, an alternating polarity output voltage of a desired frequency, shape and amplitude representing, in accordance with the preferred apparatus of the invention, a stepped approximation of a sine waveform.

In accordance with the preferred embodiment of the invention, means 18 includes a pair of diodes D11, D12 connected in parallel with their anodes connected, respectively, to primary winding end taps $t_2$, $t_3$, and with their common cathodes connected, via a series overvoltage protection resistor R3, to one input terminal of an ADC. The primary winding's center tap $t_1$ is connected through a compensation diode D13 and series resistor R4, which also form a part of means 18, to the other input terminal of the ADC. The ADC's digital output is operatively connected with an input port of a microprocessor (in the preferred embodiment of the invention, the microprocessor has multiple, integral ADC's the inputs of which may be connected to external circuitry and the outputs of which may be monitored by the microprocessor), thereby permitting the microprocessor periodically to sense the greater of the two instantaneous voltage amplitudes of either end tap of the primary winding of transformer T, and to perform the necessary processing, based upon a desired waveform stored in memory, to supply the desired switch control signals. An output port of the microprocessor is connected with latches that drive gates G1, G2, G3, G4, G5, G6, G7, G8, G9, G10. Thus, the microprocessor, memory and latch circuitry may be thought of as forming a part of means 18 for sensing the primary winding voltage, calculating the secondary winding voltage, comparing the secondary winding voltage with a stored waveform voltage and supplying switch control signals to the alternating means connected with the primary winding and to the plural switching circuits connected with the secondary winding of the transformer.

Means 18 provides for regulation of the AC voltage supplied to the AC element in real-time response to changing conditions of the DC element, e.g. battery B's sagging, and of the AC element, e.g. motor M's surging. Thus, one important advantage of the invention is that, as may be seen from FIG. 2K, the peak output voltage during each half cycle of the periodic output waveform can be highly controlled, in response, for example, to AC load surges or DC source sagging (depletion or discharge). This is accomplished in accordance with the preferred embodiment of the invention by a control routine executed by the controller 16, as will be described below by reference to FIGS. 3A through 3D.

The effectiveness of apparatus 10 in providing regulation responsive to, for example, a changing load condition may be seen by a comparison of the left and right halves of the waveforms shown in FIGS. 2A through 2K. One complete cycle of the operation of apparatus 10, in operative connection with a 7.5-watt lightbulb as the AC element, is shown on the left side of the figures, and one complete cycle of its operation, when connected with a 300-watt lightbulb, is shown on the right side thereof. In both cases, a nominal +12-volt battery is used as the DC element. The voltage versus time waveforms of FIGS. 2A through 2K will be understood to be somewhat idealized for the sake of simplicity of illustration, and do not show, for example, variations in the transitions that could occur during the switching between the multiple intermediate and end taps of the secondary winding of transformer T, such variations being load-dependent. It will also be understood that such AC cycles as are shown on the left and right sides of the figures are not consecutive cycles of operation of apparatus 10, but rather may be substantially separated in time, as indicated by the fragmentary, horizontal timelines.

The discrete voltage levels represented by the steps in the AC waveform on the left of FIG. 2K are approximately ±90-volts, ±115-volts, ±140-volts and ±175-volts, which levels are substantially the same as the peak amplitudes of the corresponding secondary tap $t_5$, $t_6$, $t_7$ and $t_8$ voltages on the left, respectively, of FIGS. 2C, 2D, 2E and 2F. Those skilled in the art will appreciate that there are slight voltage drops across the series shunt diode and conducting FET switch device of the switch device pairs that form each switching circuit 14. In contrast, the discrete voltage levels represented by the steps in the AC waveform on the right of FIG. 2K are approximately ±90-volts, ±110-volts, ±135-volts and ±160-volts, which levels similarly are substantially the same as the peak amplitudes of the corresponding tap voltages on the right of FIGS. 2C through 2F. These voltage amplitude differences are due to a greater/lesser voltage drop across the primary winding of transformer T under different load conditions. Differences in the timing of the various tap switchings are also readily apparent from a comparison of the left and right sides of FIGS. 2G through 2K, which timing is controlled by controller 16 and which timing is responsive to the substantial difference between the AC loads connected to apparatus 10.

Importantly, the measured RMS voltages of the left and right side waveforms in FIG. 2K are nearly identical, despite the fact that the loads are substantially different. The RMS voltage of the waveform on the left side of FIG. 2K is 118.5-volts and the RMS voltage of the waveform on the right side of FIG. 2K is 119.2-volts. This illustrates one of the advantages of the present apparatus and its novel regulation scheme, whereby the RMS voltage delivered to a load can be maintained with great accuracy. Some AC loads are intolerant of power converters that are incapable of delivering a rated RMS voltage under a broad range of operating conditions, e.g. during start-up of a motor. Moreover, the AC waveforms on the left and right side of FIG. 2K may be seen to be half-cycle symmetric, which symmetry limits the amount of conducted noise into the AC element. Such half-cycle symmetry is provided by the control algorithm implemented in software that executes within the microprocessor of controller 16, which control algorithm now will be described by reference to the flowcharts of FIGS. 3A through 3D.

FIGS. 3A through 3D are flowcharts that implement the method by which controller 16 monitors the voltage across the primary winding of transformer T and generates switch control signals to FET switch device gates G1, G2, G3, G4, G5, G6, G7, G8, G9, G10. The flowcharts also describe the preferred method of the invention by which the frequency, amplitude and shape characteristics of the voltage waveform at wired-OR junction J are controlled. The flowcharts describe a process that may be implemented in software, firmware or hardware, or a combination thereof, within the spirit of the invention. In the preferred embodiment of the invention, the illustrated processes are implemented in firmware that resides in the ROM, and is executed by the microprocessor, that form a part of controller 16.

It is noted that diagramming conventions have been adopted, including a generally top-to-bottom and left-to-right directional flow. The ellipses indicate routine or subroutine entry or exit points, or are used for comments regarding functional requirements or results (e.g. entries/exits/comments 100, 102, 104, 106, 108, 110, 112, 114). The rectangles indicate task or action blocks (e.g. action blocks 116, 118, 120, 122, 124, 126, 128, 130, 132, 134, 136, 138, 140, 142, 144, 146, 148, 150, 152, 154, 156, 158, 160, 162, 164, 166, 168, 170, 172, 174, 176, 178, 180, 182, 184, 186, 188, 190, 192, 194, 196). The rhombuses indicate decision blocks (e.g. decision blocks 198, 200, 202, 204, 206, 208, 210, 212, 214, 216, 218), with the answer to the enclosed question determining the decisional path next taken. The flowcharts of FIGS. 3A through 3D are believed to be self-explanatory to persons skilled in the art, but will be described in some detail below.

Various signatures representing signals, blocks and variables appearing in the flowcharts of FIGS. 3A through 3D first will be described, so that their meaning is clear to those skilled in the art:

LMOD: LMOD stands for low-voltage module switches SW1, SW2, and represents a two bit wide binary output switch control signal pair that controls gates G1, G2

HMOD: HMOD stands for high-voltage module switch devices SW3, SW4, SW5, SW6, SW7, SW8, SW9, SW10, and represents an eight bit wide output switch control signal byte that controls gates G3, G4, G6, G7, G7, G8, G9, G10 slice: slice is the number of the current slice, and ranges from 1 up to 15 during the first and third quarter cycles and from 14 down to 0 during the second and fourth quarter cycles thereby indicating which one of fifteen slices within each quarter cycle is currently under consideration for switching circuit change determinations, and is used as an index, or pointer offset, into various lookup tables in RAM count: count is a loop counter used by the microprocessor to maintain the proper number of time slices per quarter cycle, which is fifteen in the preferred embodiment of the invention timer: timer is the number or count of a down counter that represents the time remaining in the current time slice synch: synch is the number or count of a down counter that represents an offset version of timer, and is used to ensure the synchronized opening and closing of switch devices SW1, SW2, SW3, SW4, SW5, SW6, SW7, SW8, SW9, SW10, despite software execution latency or other time variances OTS: OTS stands for off-time shorting, or lull, intervals of time during which neither of switches SW1, SW2 are conducting (and during which a selected two or more of switching circuits 14 are conducting) and, accordingly, during which the primary winding of transformer T is deenergized delay: delay is the number or count of a down counter that represents the time remaining in the current OTS interval X: X is a current state variable, or index, that is used as a multiplier in managing a tap selection lookup table Y: is used in a manner similar to that of X, but is a next state variable, or index x: x is a variable ranging from 0 (corresponding to OTS intervals) to 4, and represents the state of the series-connected switch devices at a given tap level y: y is similar to x, and represents the state of the switch devices at the next higher tap level above that of x z: z is similar to y, and represents the state of the switch devices at the next higher tap level above that of y a: a represents the tap lead-connected side of a given FET switch device (the ones on the left in FIG. 1), and is used with x, y (e.g. "xa, ya on") to represent the state of individual switch devices of switching circuits 14 (e.g. G3, G4 of SW3, SW4 would be on and G5, G6, G7, G8, G9, G10 of SW4, SW5, SW6, SW7, SW8, SW9, SW10 would be off)

b: is similar to a, but represents the wired-OR junction J side of a given FET switch device (the ones on the right in FIG. 1) and is used with x, y (e.g. "xa, yb on") to represent the state of individual switch devices of switching circuits 14 (e.g. G3, G6 of SW3, SW6 would be on and G4, G5, G7, G8, G9, G10 of SW4, SW5, SW7, SW8, SW9, SW10 would be off)

Figure 3A:
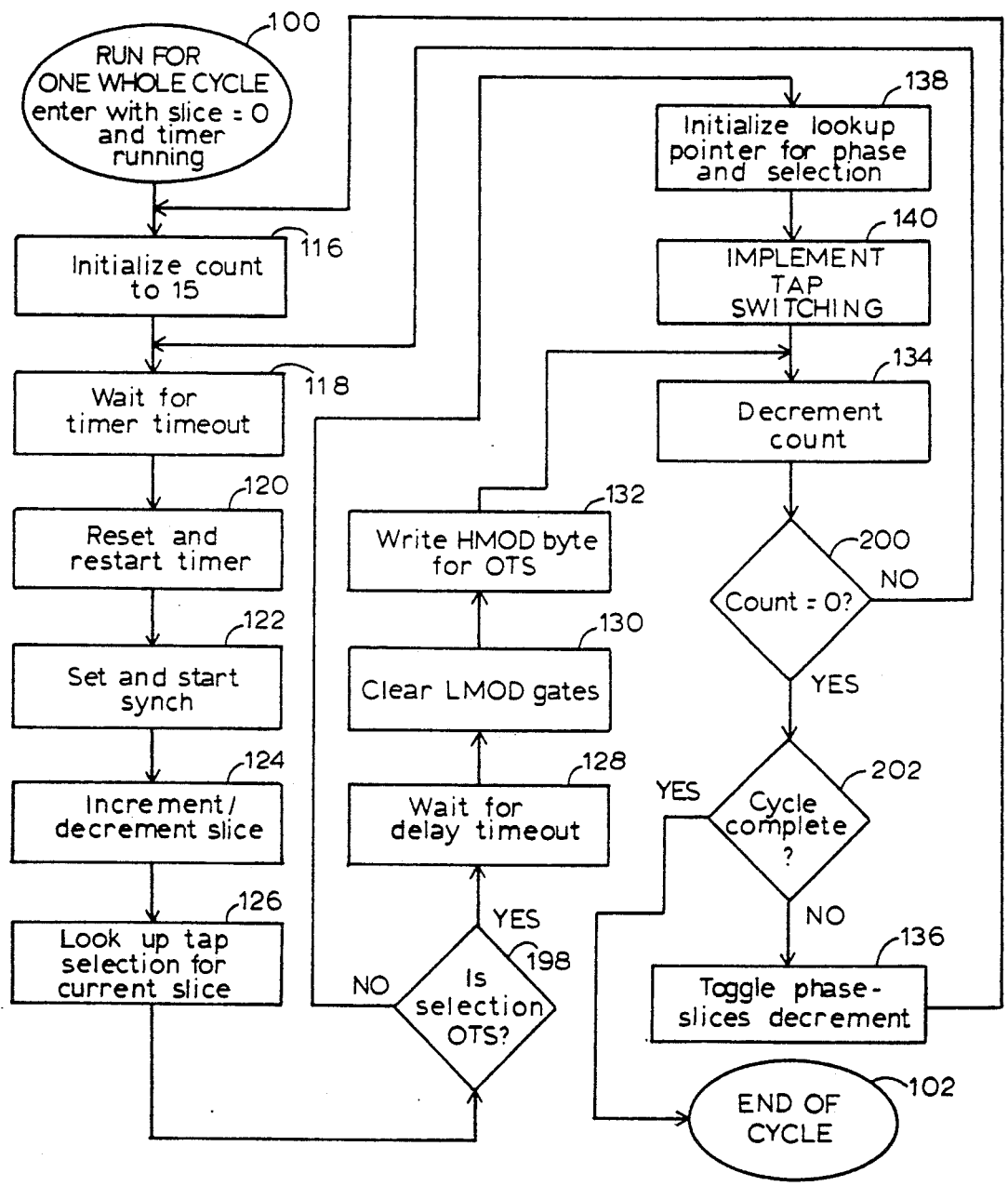
FIGS. 3A through 3D are a series of flowcharts illustrating the preferred method of the invention.

Referring first to FIG. 3A, the overall flow of the switch control and regulation method of the invention from slice to slice and from phase to phase is described. It may be seen that the flowchart of FIG. 3A is traversed once during each cycle of the AC waveform. This involves counting down count from 15 to 0 four times, once for each quarter cycle, as indicated by action blocks 116, 134 and 136 and by decision blocks 200, 202. At 118, the process is made to begin at the start of a current slice by awaiting the timeout of the timer, which is then restarted at 120 for a like period of time.

At 124 slice is incremented (during the first and third quarter cycles) or decremented (during the second and fourth quarter cycles), depending upon the state of a boolean variable called phase-slices decrement the state of which is toggled at 136 at the end of each quarter cycle, i.e. when count reaches zero.

Figure 3B:
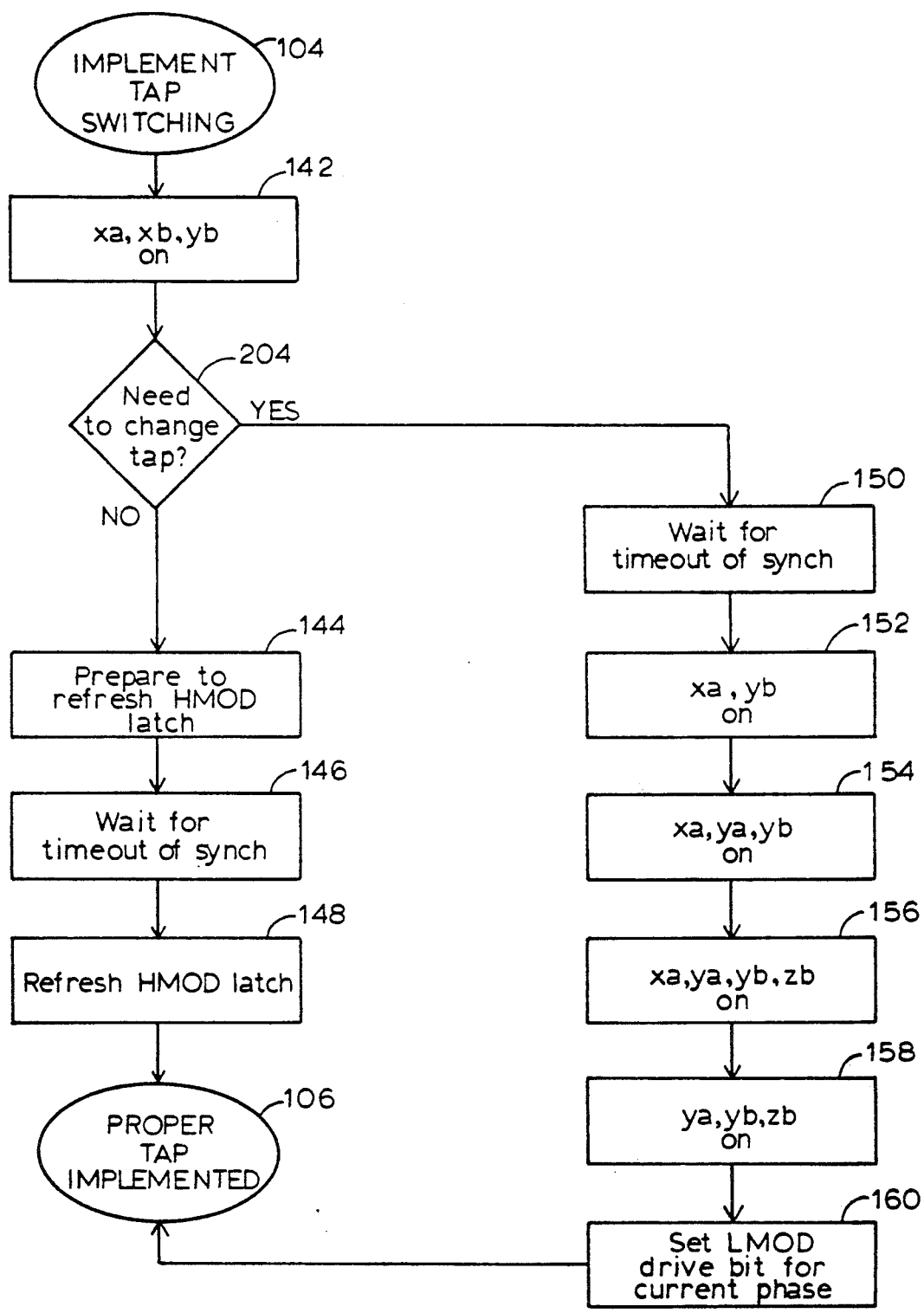
Figure 3C:
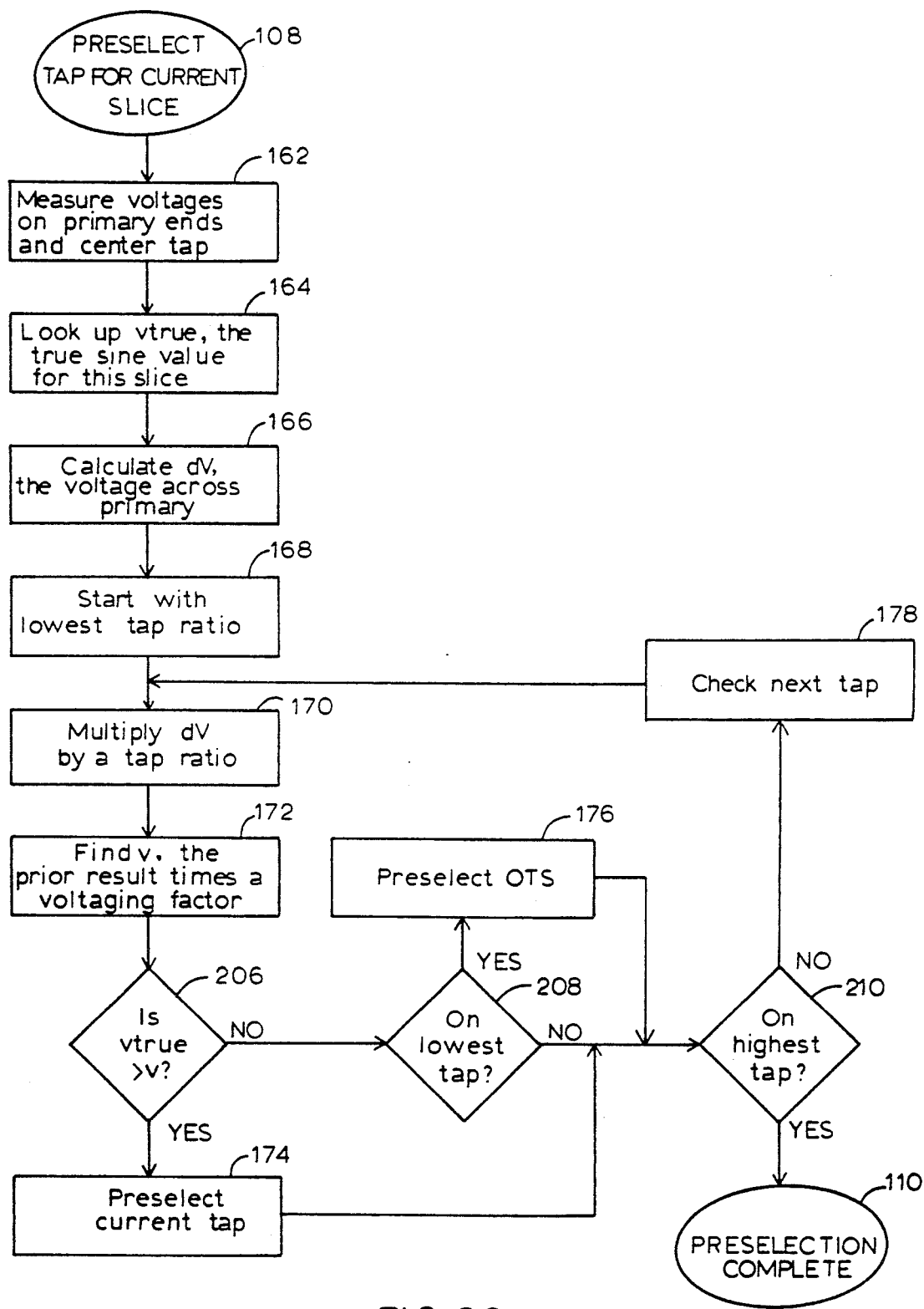
Figure 3D:
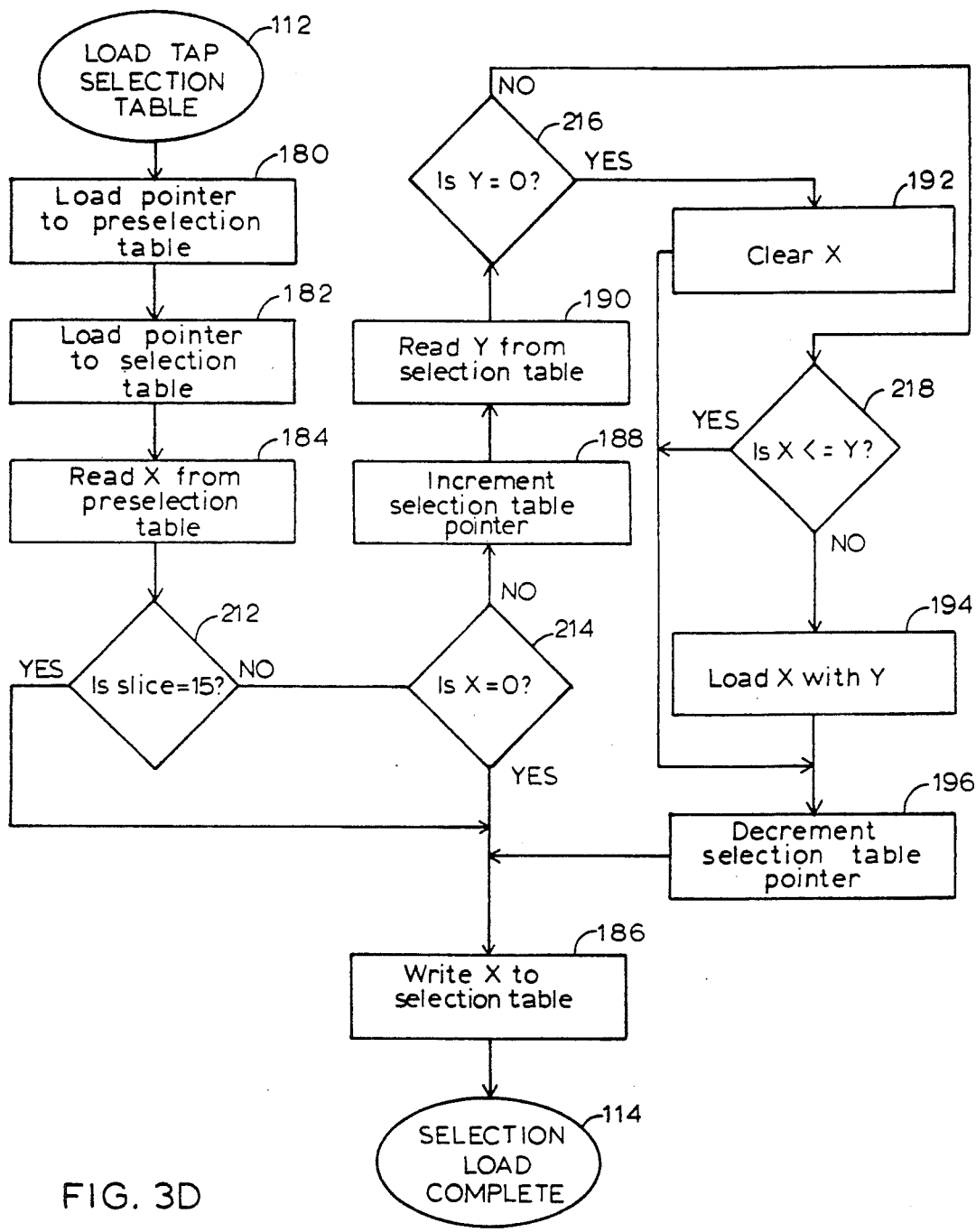

At 126, a tap selection, which has been established by a concurrently executing software task that is flowcharted in FIG. 3D, is interrogated. If the current slice's tap selection indicates an OTS interval, then action blocks 128, 130, 132 select the proper tap by clearing the latches driving gates G1, G2 and by writing a predefined OTS byte to the latches driving gates G3, G4, G5, G6, G7, G8, G9, G10. Those skilled in the art will appreciate that, in order to collapse the magnetic field in the secondary winding, at least two secondary taps need to be operatively connected together during the OTS interval. By the preferred method of the invention, this is accomplished by turning on the switching circuits which are connected to secondary taps $t_5$, $t_6$, thereby effectively to short the two lowest level taps together during the OTS intervals. If the current slice's tap selection is not an OTS interval, then action blocks 138, 140 initiate a tap switching sequence now to be described by reference to FIG. 3B.

FIG. 3B charts the preferred method by which controller 16 produces switch control signals to effect a desired secondary winding tap change. Action block 142 establishes the "normal" state of groups of the switch devices of switching circuit 14 in which, for example, G3, G4, G6 are active (low) and G5, G7, G8, G9, G10 are inactive (high), which gate state closes (or causes conduction across) switch devices SW3, SW4, SW6 and which gate state opens (or causes non-conduction across) switch devices SW5, SW7, SW8, SW9, SW10. This state of the switch devices connects the selected tap, e.g. $t_5$, to wired-OR junction J, and also permits switch device SW6 to snub any voltage spikes that the AC element produces, thereby preventing them from feeding back into transformer T. Those skilled in the art will appreciate that the "normal" state "xa, xb, yb on" describes the desired relationship among the switch devices of switching circuits 14 when the common drains of FET switch devices SW4, SW6, SW8, SW10 are at a higher voltage than the neutral, or common secondary winding tap $t_4$. In other words, it is the desirable state of switching circuits 14 during positive output voltage waveform excursions, or positive phases (first and second quarter cycles) of an AC cycle. During negative output voltage waveform excursions, the roles of series switch devices corresponding to a given secondary winding tap are reversed, i.e. "xa, xb, ya on" describes the "normal" state of the switch devices during negative phases (third and fourth quarter cycles) of an AC cycle.

Referring still to FIG. 3B, at 204 the determination is made whether tap switching is required. If not, then the latches that drive HMOD gates G3, G4, G5, G6, G7, G8, G9, G10 synchronously are rewritten at action blocks 144, 146, 148 with the very same byte as in the previous time slice, in order to maintain the current tap x selection. No change is required to LMOD gates G1, G2. If so, then the latches that drive the HMOD gates synchronously are written with a new value in the sequence illustrated in action blocks 152, 154, 156, 158, 160, in order to change the HMOD tap selection from tap x (the tap at a given level) to tap y (the tap at the next higher level, assuming there is a next higher level tap). At 152, xb is turned off, i.e. the wired-OR junction J-connected switch device of the previously selected tap, e.g. SW4, is opened. At 154, ya is turned on, i.e. the next higher tap's tap-connected switch device, e.g. SW5, is closed. At 156, zb is turned on, i.e. the wired-OR junction J-connected switch device, e.g. SW8, is closed. At 158, xa is turned off, i.e. the previously selected tap's tap-connected switch, e.g. SW3, is opened. Finally, at 160, the latches driving LMOD G1, G2 are set to effect proper phasing, as controlled by alternating means 12.

The switching sequence shown in FIG. 3b has been found to operate switching circuits 14 effectively to produce the stepped approximation to a sine waveform shown in FIG. 2K. Importantly, both switch devices forming the switching circuit connected to a higher tap are turned on before the latter of the two switch devices of the switching circuit connected to a lower tap is turned off. This prevents the output AC waveform from having negative- and positive-going spikes, or transients, at the voltage steps or transitions. In the preferred embodiment of the invention, a time overlap when one or more of two switch devices of both an upper and lower switching circuit are conducting (or the lapse between the time when ya is turned on at 154 and the time when xa is turned off at 158) is approximately 1-$\mu$s, which is long enough to prevent undesirable switching transients but short enough to avoid adverse effects on the switch devices or the AC element connected thereto.

Persons skilled in the art will appreciate that the snubbing switch device connected with the tap above the currently selected tap is turned on prior the turning off of the latter of the two series-connected switch connected with the previously selected tap. This is shown by the sequence of action blocks 156, 158 of FIG. 3B, wherein zb is turned on (at 156) before xa is turned off (at 158). This sequencing ensures that there is always provided an operative snubbing switch device at a higher level tap when apparatus 10 is switching from one tap to another (except when the highest level tap is selected, in which case there is no higher level tap and thus no snubbing occurs).

Concurrently ongoing with the process described above in reference to FIGS. 3A and 3B are two phases of a tap selection process that now will be described by reference to FIGS. 3C and 3D. The first phase of the tap selection process is illustrated in FIG. 3C by which "preselection" decisions are made and stored in a preselection table, or buffer, in RAM. The second phase of the tap selection process is illustrated in FIG. 3D by which the "preselection" decisions are downloaded, or moved, from the preselection table into a tap selection table used at action block 126 of the RUN FOR ONE WHOLE CYCLE process illustrated in FIG. 3A to actually effect OTS interval or tap selection by setting or clearing the LMOD latches and by writing or refreshing the HMOD latches of controller 16. Those skilled in the art will appreciate that the process illustrated in FIGS. 3C and 3D preferably are software tasks that execute within the microprocessor of controller 16 concurrently with the higher level process illustrated in FIGS. 3A and 3B.

The tap preselection process illustrated in FIG. 3C implements the preferred voltage regulation method of the invention. At action blocks 162, 166, 168, 170, 172, the average voltage amplitude v for the current slice is calculated, based upon the sensed, or measured, voltage across the primary under load and the turns ratios of the multiple secondary winding taps. At action block 164, the current slice's "ideal" instantaneous voltage amplitude vtrue is determined by looking up a stored sine wave value that is normalized, for comparison purposes, to the value of the calculated voltage, based upon the magnitude the nominal desired AC output voltage, e.g. ±120-volts. At decision block 206, the calculated average output voltage v for the current slice is compared to the stored sine wave value vtrue for the current slice.

If v is less than or equal to vtrue, then the next higher tap is preselected, since the selection of a higher tap should result in a higher amplitude voltage that would more closely correspond with that of a true sine waveform. If v is greater than vtrue, then controller 16 determines at 208 whether the lowest tap is currently selected. If the lowest tap is selected, yet the average calculated output voltage is higher than the corresponding, normalized sine waveform voltage, then no tap should be selected. Accordingly, at action block 176, an OTS interval is preselected that will reduce the output voltage level even further. If the lowest tap is selected, and the average calculated output voltage is less than or equal to the corresponding, normalized sine waveform voltage, then at 210 controller 16 determines whether the highest tap is currently selected. If so, then no higher tap is available and preselection is complete, since the highest possible voltage for the current slice already is being output. If not, then the average output voltage that would be produced by selection of the next higher tap is compared to vtrue by repeating action blocks 170, 172 with the next higher tap ratio. Ultimately, a tap preselection is made that will produce an average output voltage for the next slice that is as close as possible to a corresponding instantaneous voltage amplitude of the desired, stored AC waveform. For reasons that will be clear upon consideration of the tap selection table loading process illustrated in FIG. 3D, the tap preselection is not yet used to effect tap section.

FIG. 3D illustrates a process that, responsive to the tap preselection process, determines whether to actually implement the indicated selection. The key feature of the LOAD TAP SELECTION TABLE process is its imposition of certain constraints upon tap selection including the constraint that the voltage at wired-OR junction J should not undergo any mis-steps within any given quarter cycle. Such mis-steps might include an undesirable change in the sign of the slope of the voltage amplitude due, for example, to an abrupt change in the power supplied by a DC element or the load presented by an AC element. Accordingly, the LOAD TAP SELECTION TABLE process loads the tap selection table with the tap preselection indicated by the PRESELECT TAP FOR CURRENT SLICE process only if the tap change would not, during a given quarter cycle, 1) select a lower level tap when the absolute value of the amplitude of the ideal sine waveform is increasing (first and third quarter cycle) or a higher level tap when the absolute value of the amplitude of the ideal sine waveform is decreasing (second and fourth quarter cycle), or 2) more than once initiate or terminate an OTS interval.

Referring still to FIG. 3D, at action blocks 180, 182, 184 pointers into the preselection and selection tables are loaded, and X is read from the former. At decision block 212, if slice=15, then the phase angle of the AC waveform is $(2n-1)\cdot 90°$, a time between quarter cycles at which the sign of the slope of the AC waveform should change. If slice <15, then it is determined at 214 whether X=0, which indicates that an OTS interval preselected. If slice <15 and X>0, then at 188, 190 the selection table pointer is incremented and Y is read therefrom. At decision blocks 216, 218 and action blocks 192, 194, the current state variable X is replaced with the next state variable Y, so long as $0<Y\leq X$, thereby preventing a change of the sign of the slope of the waveform within a quarter cycle. If the next state variable Y indicates an impending OTS interval, then X is cleared regardless of the relationship between the two state variables.

At action block 196, the selection table pointer is restored to point at the current selection. Whether it was read from the preselection table at 184, cleared at 192 or replaced by Y at 194, X is written at 186 to the selection table, where it is available for look-up by the higher level process illustrated in FIGS. 3A, 3B.

The process of optimizing the choice of tap so that the calculated output voltage most closely matches an ideal sine wave voltage preferably is repeated at a rate that yields desirable responsiveness to changing conditions of the DC and AC elements, but prevents undesirable over-responsiveness, e.g. oscillation. It is believed that permitting the tap selection process to respond to changes of condition in the DC element and AC element within approximately 6–10 AC cycles provides sufficiently real-time response in most power conversion applications. Those of skill in the arts will appreciate that other tap selection control methods and implementations—whereby multiple tap leads of a multi-tapped secondary winding of a transformer are selectively, sequentially switched to a common wired-OR junction to supply a stepped approximation to a desired, stored waveform in real-time response to changing conditions of the DC or AC elements connected thereto are within the spirit of the invention.

It will be understood that, if the DC element has a high output voltage, then controller 16 would not necessarily select highest level tap $t_8$ during every cycle or, for that matter, during any cycle. If, on the other hand, the DC element has a low output voltage, then the controller would turn on highest level tap $t_8$ every cycle (twice: once during the positive excursion or phase and once during the negative excursion or phase) for quite some time, thereby to output a peak amplitude signal that is desirably close to the desired peak voltage of a sine waveform and to render the output RMS voltage as close as possible to the RMS voltage of a true sine wave of corresponding peak amplitude. In such a switching sequence, a so-called voltaging factor is used at action block 172 of the tap preselection process charted in FIG. 3C as a further multiplier of the sensed primary winding voltage, which factor takes into account the multi-cycle averaging effect of alternately higher and lower voltage waveforms.

The process by which selected cycles are governed by particular tap switching sequences and alternate cycles are governed by other sequences is referred herein as cycle swapping. In a given AC cycle, the RMS voltage of the AC waveform produced by apparatus 10 might be less than the desired RMS voltage, and in another AC cycle, the RMS voltage of the output AC waveform might be more than the desired RMS voltage. By alternating AC cycles between the higher and lower RMS voltage-producing waveforms, an average RMS voltage is produced that is closer to the desired RMS voltage than either of the alternate RMS voltage components. Such a modified tap-switching control process readily may be implemented in accordance with the present invention, and is made extremely straightforward by virtue of the programmability of the microprocessor in controller 16. Such a cycle-swapping control process is especially suited to use in a modification to the preferred embodiment of the invention in which power conversion apparatus operating as a battery charger only is proposed.

Figure 4:
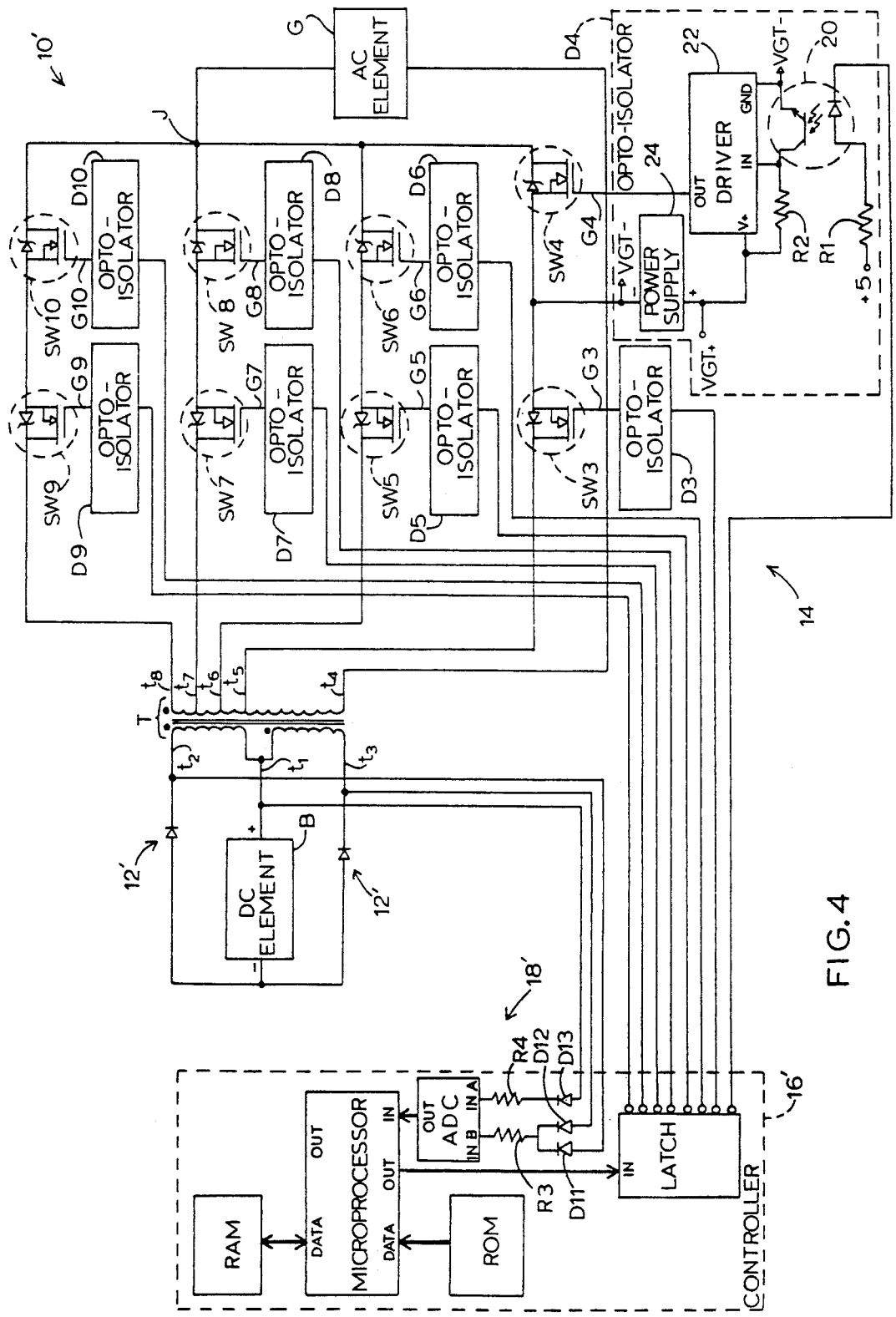
FIG. 4 is a schematic/block diagram similar to that of FIG. 1, except it illustrates a modification to the preferred embodiment by which the apparatus operates as a battery charger.

Turning now to FIG. 4, a modification to the preferred embodiment of the invention is indicated generally at 10'. It will be appreciated that FIG. 4 is similar to FIG. 1, and that identical elements are identically designated while similar elements are labeled with primed versions of the reference designators identifying their FIG. 1 counterparts. For example, power conversion apparatus 10' includes multi-tapped transformer T and plural switching circuits 14 connected therewith in an identical configuration with that of the preferred embodiment, with a common lead of the secondary winding of transformer T and the common side of switching circuits 14 being operatively connectable with an AC source, e.g. a generator G. Like apparatus 10, apparatus 10' has a controller 16' supplying switch control signals to plural switching circuits 14 in a desirable timing sequence, although the timing sequence is different from that supplied by controller 16. Finally, like polarity alternating means 12 of apparatus 10 including diodes shunting the drains and sources of FET switch devices, apparatus 10' includes diodes 12', which are operatively connectable with a DC load, forming means for rectifying an AC voltage appearing across the primary winding of transformer T.

In accordance with the modification to the preferred embodiment in which apparatus 10' operates as a charger only, controller 16' is effectively synchronized with such connected AC source by a voltage sampling process similar to that used in the preferred method of the invention to produce the stepped approximation to a sine waveform output in which apparatus 10 operates principally as an inverter. Controller 16' includes means 18' for sensing the voltage appearing 1) across the DC load, e.g. battery B, (which connection to an ADC of controller 16' is not shown in FIG. 4, for the sake of clarity), 2) across the primary winding of transformer T (which connection to an ADC of controller 16' is shown in FIG. 4 to be identical to that of apparatus 10) and 3) between wired-OR junction J and the common tap lead of the secondary winding of transformer T (which connection to an ADC of controller 16' also is not shown in FIG. 4). In response to such sensed voltages, controller 16' supplies switch control signals to plural switching circuits 14 in a timing sequence that supplies a DC voltage having desired characteristics from the AC source to the DC load.

Those skilled in the art will appreciate that the timing sequence in which the switch control signals are supplied by controller 16' is different from, and more straightforward than, the timing sequence discussed in detail above with reference to FIGS. 3A through 3D. The cycle-swapping tap-switching control method described above lends itself especially well to a battery charger application, which involves a fixed power factor. Briefly, control of plural switching circuits 14 in such an application involves determining when the absolute value of the instantaneous AC voltage being supplied by generator G is higher than the DC voltage across battery B, since these are the instants in time when charging current is available. By sensing the AC voltage at a plurality of locations within power conversion apparatus 10', plural switching circuits 14 can be optimally selected to conduct current between wired-OR junction J and multiple intermediate and second end taps $t_5$, $t_6$, $t_7$, $t_8$, thereby producing via rectifier means 12' a full-wave rectified DC voltage having desired characteristics at the terminals of battery B. Those skilled in the art will appreciate that such controlled sequencing of plural switching circuits 14 to charge a battery while producing a minimum level of RFI readily can be achieved by a control algorithm suitably adapted from that described above in relation to apparatus 10.

Because all of the switch control signals for both the primary winding FET switch device gates G1, G2 and the secondary winding FET switch device gates G3, G4, G5, G6, G7, G8, G9, G10 are supplied by a controller including a programmable microprocessor, it is possible to program the microprocessor to take advantage of changing conditions of either the DC element or the AC element, or both. When the apparatus of the invention in its preferred or modified embodiments is operating as a battery charger, its RFI radiation level is lower than that of the prior art sine wave, or square wave converters operating as battery chargers. This is because of the symmetry of the secondary winding's switching sequence. Moreover, because the apparatus of the invention produces less abrupt current changes in operation, whether operating as a battery charger or inverter (these corresponding to the relatively low amplitude dv/dt steps that are established by the multiple taps on the secondary winding of the transformer T), less conducted noise is fed into the AC element (which may be a utility that prohibits or at least regulates such noise conduction).

In summary, the apparatus of the invention in its preferred embodiment provides an optimum tradeoff between THD and RFI radiation, while operating bidirectionally as both inverter and charger, with the circuit being capable of withstanding substantial and/or abrupt changes, for example, in the complex resistance and resulting power factor of the DC and/or AC element. Similarly, the apparatus in its modified embodiment provides an optimum tradeoff between THD and RFI radiation, while operating as a charger, with the circuit being highly responsive to changes in the charged condition of, for example, a battery or in the charging capacity of, for example, a generator of a system having a fixed power factor. This is because of the process by which instantaneous voltages at various locations within the apparatus of the invention are sensed, decisions are made based thereon by the microprocessor and switch control signals are supplied in real-time response to changing conditions on the primary winding or secondary winding side of the multi-tapped transformer.

The preferred method of the invention now may be understood in light of an understanding of the preferred embodiment. The preferred method is for use in a DC-to-AC power conversion system such as that shown in FIG. 1 including a DC source, e.g. battery B; a transformer such as transformer T having a primary winding impressed, as by polarity-alternating means 12, with an input voltage periodically alternating at a first frequency, e.g. 60-Hz, and a multi-tapped secondary winding, with the taps of predefined turns ratios being selectively switchable, e.g. via plural switching circuits 14, by a controller such as controller 16 to supply an alternating polarity sequence of discrete output voltage levels to an AC load, e.g. motor M, in a stepped approximation to a sine waveform such as that shown in FIG. 2K. The preferred method will be understood to be responsive to changing conditions of DC source or AC load, also as described and illustrated in reference to FIG. 2K.

The preferred method is for generating such a stepped approximation to a sine waveform. It includes the steps of 1) sensing the instantaneous amplitude of the input voltage across the primary winding of the transformer; 2) calculating the instantaneous amplitude of the output voltage corresponding to such sensed input voltage based upon the predefined turns ratios of the multi-tapped secondary winding of the transformer; 3) comparing the calculated instantaneous amplitude of the output voltage to a stored sine waveform having a desired peak amplitude; and 4) selectively switching the taps of the secondary winding of the transformer to supply an instantaneous output voltage level to the AC load that approximates such a sine waveform having the desired peak amplitude. The preferred method also includes repeating above steps 1) through 4) periodically at a second frequency substantially higher than the first frequency, thereby to supply the AC load an alternating polarity stepped voltage waveform having characteristics which are responsive in real time to changing conditions of the DC source and the AC load.

Accordingly, while preferred and modified embodiments, and a preferred method, of the invention have been described herein, it is appreciated that further modifications are possible that are within the scope of the invention.

It is claimed and desired to be secured by Letters Patent:

1. For use with an AC element having a nominal operating frequency, power conversion apparatus comprising:
   a transformer having a primary winding and a secondary winding including multiple tap leads and a common lead connectable with a first terminal of an AC element;
   alternating means connectable with a DC source for impressing a periodically alternating-polarity voltage across said primary winding of said transformer to produce pairs of alternately positive-going and negative-going voltage pulses on said tap leads, wherein said pulse pairs occur at an alternation frequency that is equal to the nominal operating frequency of such AC element;
   switching means interposed between said tap leads and a second terminal of such AC element, said switching means being switchable under the influence of control signals sequentially to select ones of said tap leads to be conductively connected with the second terminal of such AC element; and
   a switch controller generating control signals to said switching means in such manner that plural ones of said tap leads are conductively connected with the second terminal of such AC element during controllably brief periods of time and that only one of said tap leads at a time is so-connected during controllably relatively substantially longer periods of time within each AC cycle.

2. Power conversion apparatus comprising:
   a transformer having a primary winding and a secondary winding connectable with an AC load and plural individual leads corresponding to plural taps having predefined graduated turns ratios relative to said primary winding;
   alternating means for selectively operatively impressing a DC voltage of periodically alternating polarity across said primary winding of said transformer at a first nominal frequency;
   plural switching circuits operatively connected with said secondary winding of said transformer and responsive to switch control signals, with one side of each of said switching circuits being operatively connected with a corresponding one of said plural leads of said secondary winding of said transformer and with the other side of each of said switching circuits being operatively connected with one another and being operatively connectable with such AC load, each of said switching circuits in a first non-conducting state operatively isolating said corresponding one of said plural leads from such AC load and in a second conducting state operatively connecting said one of said plural leads with such AC load;
   a controller supplying said switch control signals at a second frequency that is of the same order of magnitude as said first nominal frequency to said plural switching circuits in a desirable timing sequence, thereby to supply an AC voltage of a desired waveform to such AC load.

3. The apparatus of claim 2, wherein said controller operates in such manner that a AC voltage having a stepped approximation to a sine waveform is supplied.

4. The apparatus of claim 3, wherein said stepped approximation to a sine waveform is symmetric over each half cycle of the alternating polarity voltage.

5. The apparatus of claim 2, wherein at least one of said switching circuits operates bidirectionally and includes dual, back-to-back, series-connected, independently controllable switching devices 6. Power conversion apparatus comprising:
   a transformer having a primary winding and a secondary winding connectable with an AC load and plural individual leads corresponding to plural taps having predefined graduated turns ratios relative to said primary winding;
   alternating means for selectively operatively impressing a DC voltage of periodically alternating polarity across said primary winding of said transformer at a first nominal frequency;
   plural switching circuits operatively connected with said secondary winding of said transformer and responsive to switch control signals, with one side of each of said switching circuits being operatively connected with a corresponding one of said plural leads of said secondary winding of said transformer and with the other side of each of said switching circuits being operatively connected with one another and being operatively connectable with such AC load, each of said switching circuits in a first non-conducting state operatively isolating said corresponding one of said plural leads from such AC load and in a second conducting state operatively connecting said one of said plural leads with such AC load;
   a controller supplying said switch control signals at a second frequency that is of the same order of magnitude as said first nominal frequency to said plural switching circuits in a desirable timing sequence, thereby to supply an AC voltage of a desired waveform to such AC load; and means operatively coupled with said controller for periodically sensing the voltage across said primary winding of said transformer, at a frequency substantially greater than the frequency with which said alternating means operates, comprising the sensed voltage level with a desired voltage level and determining the timing sequence in which said switch control signals are supplied responsive thereto.

7. The apparatus of claim 2, wherein said alternating means operates selectively in such manner that said primary winding of said transformer is deenergized for an interval of time within which the alternating polarity voltage changes polarity.

8. For use in a DC-to-DC power conversion system including a DC source, a transformer having a primary winding impressed with an input voltage periodically alternating at a first frequency, and a multi-tapped secondary winding, with the taps of predefined turns ratios being selectively switchable by a controller to supply an alternating polarity sequence of discrete output voltage levels to an AC load in a stepped approximation to a sine waveform representation stored in memory, a method responsive to changing source or load conditions for generating such a waveform comprising:

sensing the instantaneous amplitude of the input voltage across the primary winding of the transformer;

calculating the instantaneous amplitude of the output voltage corresponding to such sensed input voltage based upon the predefined turns ratios of the multi-tapped secondary winding of the transformer;

comparing the calculated instantaneous amplitude of the output voltage to a stored sine waveform representation having a desired peak amplitude;

selectively switching the taps of the secondary winding of the transformer to supply an instantaneous output voltage level to the AC load that approximates such a stored sine waveform representation having the desired peak amplitude; and repeating the above steps periodically at a second frequency substantially higher than the first frequency, thereby to supply to the AC load an alternating polarity stepped voltage waveform having characteristics which are responsive in real time to changing conditions of the DC source and the AC load.

9. A power conversion circuit usable with a DC element having a pair of terminals and with an AC element comprising:

a transformer having a primary winding with a center tap connectable with one of such DC element terminals and a secondary winding with first and second end taps and plural taps intermediate said first and second end taps, said second end tap and said intermediate taps being selected to predefine a plurality of turns ratios of the secondary winding relative to the primary winding;

a polarity-alternating circuit, responsive to switch control signals, including diode means shunted across transistor means, said polarity-alternating circuit selectively, alternately connecting either of said primary winding end taps to such other DC element terminal;

plural switching circuits, responsive to switch control signals, each of said plural switching circuits having one side operatively connected to a corresponding one of said second end tap and said intermediate taps and having the other side operatively connected with one another at a wired-OR junction;

switch controller means capable of supplying said switch control signals to said polarity-alternating circuit to produce an alternating polarity square wave the positive-going and negative-going portions of which are interposed by lull periods of time during which the primary winding of said transformer is deenergized, said switch controller means including means for sensing the instantaneous voltage amplitude between said primary winding end taps of said transformer, said switch controller means further including means for calculating a corresponding instantaneous voltage amplitude between said first end tap and said wired-OR junction based upon the predefined plural turns ratios of said secondary winding, said switch controller means further including means for comparing such calculated instantaneous voltage amplitude with a corresponding instantaneous voltage amplitude of a stored sine waveform representation to produce a comparison result, said switch controller means further including means responsive to said comparison result for supplying said switch control signals to said plural switching circuits in such manner that said second end tap and said intermediate taps selectively sequentially are operatively connected with said wired-OR junction to produce across an AC element, when operatively connected between the first end tap and said wired-OR junction, an alternating polarity output voltage of a desired amplitude representing a stepped approximation of a sine waveform.

10. A power conversion circuit usable with a DC element having a pair of terminals and with an AC element comprising:

a transformer having a primary winding with a center tap connectable with one of such DC element terminals and a secondary winding with first and second end taps and plural taps intermediate said first and second end taps, said second end tap and said intermediate taps being selected to predefine a plurality of turns ratios of the secondary winding relative to the primary winding;

a polarity-alternating circuit, responsive to switch control signals, including diode means shunted across transistor means, said polarity-alternating circuit selectively, alternately connecting either of said primary winding end taps to such other DC element terminal;

plural switching circuits, responsive to switch control signals, each of said plural switching circuits having one side operatively connected with a corresponding one of said second end tap and said intermediate taps and having the other side operatively connected with one another at a wired-OR junction;

switch controller means capable of supplying said switch control signals to said polarity-alternating circuit to produce an alternating polarity square wave the positive-going and negative-going portions of which are interposed by lull periods of time during which the primary winding of said transformer is deenergized, said switch controller means including means for sensing the instantaneous voltage amplitude between said primary winding end taps of said transformer, said switch controller means further including means for calculating a corresponding instantaneous voltage amplitude between said first end tap and said wired-OR junction based upon the predefined plural turns ratios of said secondary winding, said switch controller means further including means for comparing such calculated instantaneous voltage amplitude with a corresponding instantaneous voltage amplitude of a stored sine waveform representation to produce a comparison result, said switch controller means further including means responsive to said comparison result for supplying said switch control signals to said plural switching circuits in such manner that said second end tap and said intermediate taps selectively sequentially are operatively connected with said wired-OR junction to produce across an AC element ,when operatively connected between the first end tap and said wired-OR junction, an alternating polarity output voltage of a desired amplitude representing a stepped approximation of a sine waveform, wherein at least one of the plural switching circuits includes a pair of back-to-back series-connected switch devices, whereby said switching circuit including said pair when selected is capable of conducting current either from such DC element to such DC element or from such AC element to such DC element.

11. The circuit of claim 10, wherein each of said switch devices of said pair of switch devices of at least one of said switching circuits including said pair is responsive to corresponding dual switch control signals produced by said switch controller means to operate the switch devices of said pair independently from one another.

12. Power conversion apparatus comprising:

a transformer having a primary winding and a secondary winding, with the secondary winding having a common lead connectable with an AC source and plural individual leads corresponding to plural taps having predefined graduated turns ratios relative to said primary winding;

rectifier means operatively connectable with a DC load for rectifying an AC voltage appearing across said primary winding of said transformer;

plural switching circuits operatively connected with said secondary winding of said transformer and responsive to switch control signals, with one side of each of said switching circuits being operatively connected with a corresponding one of said plural leads of said secondary winding of said transformer and with the other side of each of said switching circuits being operatively connected with one another and being operatively connectable with such AC source, each of said switching circuits in a first non-conducting state operatively isolating said corresponding one of said plural leads from such AC source and in a second conducting state operatively connecting said one of said plural leads with such AC source;

a controller synchronized with such AC source supplying said switch control signals to said plural switching circuits in a desirable timing sequence, thereby to supply a DC voltage having desired characteristics from such AC source to such DC load.

* * * * *

UNITED STATES PATENT AND TRADEMARK OFFICE
CERTIFICATE OF CORRECTION

PATENT NO. : 5,155,672
DATED : October 13, 1992
INVENTOR(S) : Craig W. Brown

It is certified that error appears in the above-identified patent and that said Letters Patent is hereby corrected as shown below:

In column 19, line 8, delete "comprising" and add --comparing--.

Signed and Sealed this

Twenty-sixth Day of October, 1993

Attest:

BRUCE LEHMAN

*Attesting Officer*  *Commissioner of Patents and Trademarks*